G. Stevenson.
Harvester Dropper.
No. 92,392. Patented July 6, 1869.
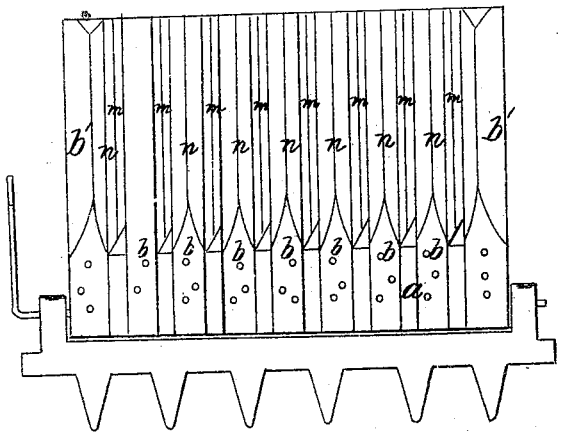
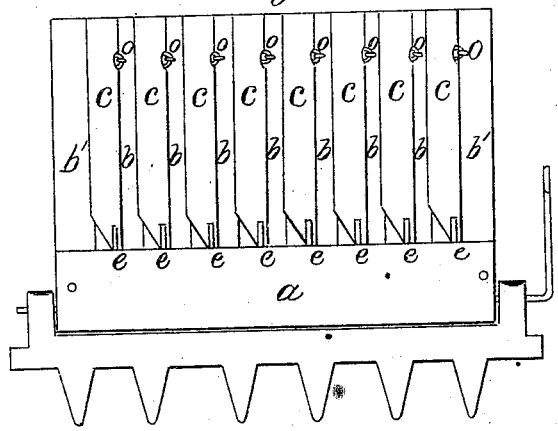
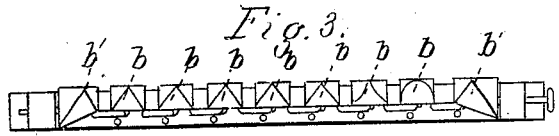
Witnesses
H. N. Miller
J. V. White
Inventor
Geo. Stevenson
Per
J. H. Alexander
Atty.

United States Patent Office.

GEORGE STEVENSON, OF ZIONSVILLE, INDIANA.

Letters Patent No. 92,392, dated July 6, 1869.

---

IMPROVEMENT IN HARVESTER-DROPPERS.

---

The Schedule referred to in these Letters Patent and making part of the same.

---

*To all whom it may concern:*

Be it known that I, GEORGE STEVENSON, of Zionsville, in the county of Boone, and State of Indiana, have invented certain new and useful Improvements in Droppers for Harvesters; and I do hereby declare that the following is a full, clear, and exact description thereof, reference being had to the accompanying drawings, and to the letters of reference marked thereon, which form a part of this specification, and in which—

Figure 1 is a top view;

Figure 2, a view of the under side of the dropper; and

Figure 3, an end view of my dropper.

My invention relates to certain improvements in harvester-droppers, and consists in connecting the fingers of a slatted dropper by gates, which are hinged to the fingers, and cover, when closed, the spaces between the fingers, so that no spaces are left, when the gates are closed, for the escape of the heads of the grain cut, which are deposited with the gavel by the dropper, the stubble opening the gates and assisting in the removal of the gavel, as in the ordinary slatted dropper.

My invention further consists in the employment of stops or pins, to prevent the hinged gates from being thrown entirely over by the action of the stubble.

My invention further consists in grooving the under sides or faces of the hinged gates, in order that the stubble may catch in said grooves in the downward movement of the dropper, and thereby may more effectively act upon said gates.

My invention further consists in inclining the outer fingers of the dropper inwards, to prevent the grain from passing off from the sides of the dropper.

My invention also consists in bevelling the lower faces of the dropper-fingers, or making them of a V-shape, in order to break down less stubble in the downward movement of the dropper, whereby a greater amount of the stubble will act upon the gavel, to assist, in conjunction with the inclined position of the dropper, to remove the gavel from the dropper.

In the accompanying drawing—

$a$ is the front bar of the slatted dropper, which is attached to the rear side of the finger-bar, and is operated by the driver in the ordinary manner, the devices for operating the dropper not being shown in the drawing, as they form no part of my invention.

$b\ b\ b$ are the fingers of the dropper, to each one of which a gate, $c$, is hinged at $o\ o$.

The front part of each gate is rounded off, and enters a hole in the rear part of the dropper-bar. By this arrangement each gate can easily be raised.

The outer bars $b'\ b'$ are inclined inwardly, which prevents any grain from passing off the sides of the dropper.

$e\ e$ are pins, which stop the movement of the gates when they attain a position nearly or quite vertical, when acted upon by the stubble in the downward movement of the dropper.

It will be seen that when the gates are closed, and the dropper in the position of receiving the grain, that the dropper presents a plane surface, with no interstices, save those immediately in rear of the dropper-bar, through which the heads of grain can fall through and be lost.

When the dropper is lowered and inclined by the driver for the discharge of the gavel, the gates are opened by the stubble, which, in conjunction with the inclined position of the dropper, effectually removes the gavel and discharges the heads, which otherwise would be lost, with the gavel.

As the stubble is employed to assist in the removal of the gavel, it is advantageous to break down as little stubble as possible in the downward movement of the dropper.

To accomplish this end, the under side of the fingers of the dropper are bevelled, or made of a V-shape, as shown at $n\ n$, fig. 1.

$m\ m$, fig. 1, are grooves, made on the under sides of the hinged gates, in which the stubble catches in the downward movement of the dropper, and acts more effectively in raising the hinged gates.

Having thus fully described my invention,

What I claim as new, and desire to secure by Letters Patent, is—

1. The gates $c\ c$, hinged to the dropper-fingers $b\ b$, as and for the purpose set forth.

2. The hinged gates $c\ c$, in combination with the pins $e\ e$, as and for the purpose set forth.

3. The grooves $m\ m$, made in the lower faces of the hinged gates $c\ c$, substantially as described.

4. The inclined outer fingers $b'\ b'$, as and for the purpose set forth.

5. The fingers $b\ b$, having their under surfaces bevelled or made V-shaped, as and for the purpose set forth.

6. The combination of the bar $a$, fingers $b\ b$, $b'\ b'$, hinged gates $c\ c$, provided with grooves $m\ m$ and pins $e\ e$, substantially as described.

In testimony that I claim the foregoing as my own, I affix my signature in presence of two witnesses.

GEORGE STEVENSON.

Witnesses:
WILLIAM C. VANCE,
THOS. H. LANE.